United States Patent [19]

Nowlin et al.

[11] Patent Number: 5,093,443
[45] Date of Patent: Mar. 3, 1992

[54] ALPHA-OLEFINS POLYMERIZATION WITH CHLORINATED ALCOHOL-CONTAINING CATALYST COMPOSITION

[75] Inventors: Thomas E. Nowlin, Somerset; Kenneth G. Schurzky, Bridgewater, both of N.J.

[73] Assignee: Mobil Oil Corporation, Fairfax, Va.

[21] Appl. No.: 540,961

[22] Filed: Jun. 20, 1990

Related U.S. Application Data

[60] Division of Ser. No. 287,214, Dec. 21, 1988, Pat. No. 4,954,470, which is a continuation-in-part of Ser. No. 143,989, Jan. 14, 1988, Pat. No. 4,849,389.

[51] Int. Cl.$^5$ .............................. C08F 4/654
[52] U.S. Cl. ................... 526/129; 526/143; 502/120
[58] Field of Search ................. 526/129, 143

[56] References Cited

U.S. PATENT DOCUMENTS

| | | | |
|---|---|---|---|
| 3,787,384 | 1/1974 | Stevens et al. | 260/94.9 DA |
| 4,063,009 | 12/1977 | Ziegler et al. | 526/159 |
| 4,076,698 | 2/1978 | Anderson et al. | 526/348 |
| 4,148,754 | 4/1979 | Strobel et al. | 252/429 |
| 4,173,547 | 11/1979 | Graff | 252/429 B |
| 4,302,566 | 11/1981 | Karol et al. | 526/125 |
| 4,378,304 | 3/1983 | Dombro | 252/429 B |
| 4,458,058 | 7/1984 | Dombro | 526/129 |
| 4,481,301 | 11/1984 | Nowlin et al. | 502/104 |
| 4,558,024 | 12/1985 | Best | 502/115 |
| 4,558,025 | 12/1985 | Best | 502/115 |
| 4,579,835 | 4/1986 | Best | 502/120 |
| 4,727,049 | 2/1988 | Furuhashi | 502/115 |
| 4,732,882 | 3/1988 | Allen et al. | 502/104 |
| 4,833,111 | 5/1989 | Nowlin | 502/107 |
| 4,849,389 | 7/1989 | Nowlin et al. | 502/107 |
| 4,954,470 | 9/1990 | Nowlin et al. | 502/107 |

OTHER PUBLICATIONS

Journal of the American Chemical Society, vol. 82, (1960) p. 1502-1503.
Journal of the American Chemical Socy., vol. 83 (1961), pp. 2654-2658.

Primary Examiner—Patrick P. Garvin
Attorney, Agent, or Firm—Alexander J. McKillop; Charles J. Speciale; Marina V. Schneller

[57] ABSTRACT

A supported alpha-olefin polymerization catalyst composition is synthesized by reacting (1) a slurry of a solid catalyst carrier in a non-polar solvent, e.g., hexane, with a dialkyl organomagnesium composition; (2) contacting the slurry of step (1) with a chlorinated alcohol; (3) contacting the slurry of step (2) with at least one transition metal compound; (4) removing the non-polar solvent to obtain a dry-flowing powder; and, (5) activating the powder with an activator. The resulting catalyst composition has high polymerization activity in the polymirazation of $C_2$-$C_{10}$ alpha-olefins and exhibits very good higher ($C_3$-$C_{10}$) alpha-olefin incorporation properties in the copolymerization of ethylene with the higher alpha-olefins.

28 Claims, No Drawings

ALPHA-OLEFINS POLYMERIZATION WITH CHLORINATED ALCOHOL-CONTAINING CATALYST COMPOSITION

CROSS-REFERENCE TO RELATED APPLICATIONS

This is a division of copending application Ser. No. 287,214, filed on Dec. 21, 1988, now U.S. Pat. No. 4,954,470, which was a continuation-in-part of application Ser. No. 143,989, filed on Jan. 14, 1988, now U.S. Pat. No. 4,849,389 the entire contents both of which are incorporated herein by reference.

The application is also related by subject matter to application Ser. No. 143,987, filed Jan. 14, 1988.

BACKGROUND OF THE INVENTION

1. Field of the Invention

The present invention relates to a method for polymerizing alpha-olefins, a catalyst for such a polymerization method and a method for producing such a catalyst. In particular, the present invention relates to a highly active catalyst, and a method for preparation thereof, which has excellent higher alpha-olefin incorporation properties and produces copolymers of ethylene with such higher alpha-olefins of excellent properties. The invention is also directed to a highly productive polymerization process carried out with the catalyst of the invention.

2. Description of the Prior Art

Linear low density polyethylene polymers posses properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describe a process for producing linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe catalysts prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound.

Dombro, U.S. Pat. Nos. 4,378,304 and 4,458,058, disclose an olefin polymerization catalyst composition synthesized by sequentially reacting: (1) a porous support with a Group IIA organometallic compound, e.g., a dialkylmagnesium; (2) the product of (1) with water or a hydrocarbyl alcohol, e.g., methanol; (3) the product of (2) with a transition metal compound or compounds. The product of the synthesis reaction is activated with a co-catalyst which is a Group IA, IIA, IIIA and/or IIB organometallic compound, including hydrogen. Suitable co-catalysts are n-butyllithium, diethylmagnesium, triisobutylaluminum and diethylaluminum chloride.

Best, U.S. Pat. Nos. 4,558,024, 4,558,025 and 4,579,835, disclose olefin polymerization catalyst compositions prepared by reacting together a porous particulate material, an organic magnesium compound, an oxygen-containing compound, a transition metal compound, e.g., a titanium compound (the '024 patent) or a vanadium compound (the '835 patent), and a co-catalyst. Some of the catalyst compositions of Best also include an acyl halide (e.g., see the '835 and the '025 patents).

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having relatively narrow molecular weight distribution produce injection-molded products exhibiting a minimum amount of warping or shrinkage. Conversely, resins having relatively broad molecular weight distribution produce injection-molded products more likely to undergo warping or shrinkage. One of the measures of the molecular weight distribution of the resin is melt flow ratio (MFR), the ratio of high melt flow index (HLMI or $I_{21}$) to melt index ($I_2$) for a given resin. The melt flow ratio is believed to be an indication of the molecular weight distribution of the polymer: the higher the MFR value, the broader the molecular weight distribution. Resins having relatively low MFR values, e.g., of about 20 to 50, have relatively narrow molecular weight distribution. Additionally, LLDPE resins having such relatively low MFR values produce films of better strength properties than resins with high MFR values. Many catalyst systems exhibit a tendency to produce resins whose MFR values, although initially low, increase with increased concentration of the catalyst activator, also known as a co-catalyst, such as various aluminum alkyls. However, under certain circumstances, it is desirable to increase the catalyst activator concentration without substantially affecting the resin MFR, e.g., to improve catalyst productivity and/or comonomer incorporation.

Another important property of LLDPE resins, manufactured into products coming into contact with articles subject to FDA regulations, e.g., foodstuffs, is hexane extractables which is a measure of the amount of low molecular weight and/or highly branched polymer fractions capable of being extracted from the manufactured products, e.g., plastic food containers, by hexane extraction. The FDA imposed strict regulations on the amounts of allowable hexane extractables in such plastic products.

Thus, Allen et al, U.S. Pat. No. 4,732,882, disclose an alpha-olefin polymerization catalyst composition activated with trimethylaluminum which produces polymers having relatively low values of MFR and low hexane extractables. However, the productivity of the polymerization process carried out with such a catalyst composition is lower than that of the process carried out with the same catalyst compositions activated with more commonly-used activators, such as triethylaluminum or triisobutylaluminum.

Accordingly, it is important to provide a catalyst composition capable of producing alpha-olefin polymers having relatively narrow molecular weight distribution (low MFR values) which remains substantially constant with varying amounts of the co-catalyst, and which catalyst composition has high activity.

It is therefore a primary object of the present invention to provide a high activity catalyst for the polymerization of alpha-olefins yielding products of a relatively narrow molecular weight distribution which is maintained substantially constant with varying amounts of the co-catalyst concentration.

It is another object of the present invention to provide a high activity catalyst composition which produces alpha-olefin polymers having relatively low hexane extractables.

It is yet an additional object of the present invention to provide a catalyst composition having excellent higher alpha-olefin incorporation properties.

It is an additional object of the present invention to provide a catalytic process for polymerizing alpha-olefins which yields linear low density polyethylene of a relatively narrow molecular weight distribution at high productivity rates.

SUMMARY OF THE INVENTION

A supported alpha-olefin polymerization catalyst composition of this invention is prepared in a multi-step process. In the first step, a mixture of a solid, porous carrier and a non-polar solvent is contacted with at least one organomagnesium composition of the formula $$R_mMgR'_n \quad (I)$$

where R and R' are the same or different $C_4$–$C_{12}$ alkyl groups, m and n are each 0, 1 or 2, providing that m+n equals the valence of Mg. Subsequently, the mixture of the first step is contacted with at least one chlorinated alcohol of formula (II), $R_2$—OH, where $R_2$ is a $C_2$–$C_{10}$ chlorinated alkyl. The resulting mixture is then contacted with at least one transition metal compound soluble in the non-polar solvent. The product (also referred to herein as "catalyst precursor") is dried and it is activated with a catalyst activator. The resulting activated catalyst composition has very high productivity in the polymerization of alpha-olefins, very effective higher comonomer (i.e., $C_3$–$C_{10}$ alpha-olefin) incorporation properties in the copolymerization of ethylene with such higher comonomers and it produces polymers having relatively narrow molecular weight distribution and low hexane extractables.

DETAILED DESCRIPTION OF THE INVENTION

The polymers prepared in the presence of the catalyst composition of this invention are linear polyethylenes which are homopolymers of ethylene or copolymers of ethylene and higher alpha-olefins. The polymers exhibit relatively low values of melt flow ratio (MFR), as compared to similar polymers prepared in the presence of previously-known catalyst compositions, e.g., those disclosed by Nowlin et al, U.S. Pat. No. 4,481,301. Thus, the polymers prepared with the catalyst composition of this invention are especially suitable for the production of films and for injection molding applications.

Catalysts produced according to the present invention are described below in terms of the manner in which they are made.

Catalyst Synthesis

The carrier material is usually an inorganic, solid, particulate porous material which is inert to the other components of the catalyst composition and to the other active components of the reaction system. The carrier material can be made from such inorganic materials as oxides of silicon and/or aluminum. The carrier material is used in the form of a dry powder having an average particle size of from about 1 micron to about 250 microns, preferably from about 10 microns to about 150 microns. The internal porosity of the carrier should be higher than 0.2 $cm^3$/gm, e.g., from about 0.5 $cm^3$/gm to about 15 $cm^3$/gm. The specific surface area of the carrier is at least about 3 square meters per gram ($m^2$/gm), and preferably at least about 50 $m^2$/gm. The carrier material should be dry, that is, free of absorbed water. Drying of the carrier material can be effected by heating at about 100° to about 1000° C. and preferably at about 600° C. When the carrier is silica, it is heated at a temperature of at least about 200° C. The carrier material must have at least some active hydroxyl (OH) groups to produce the catalyst composition of this invention.

In the most preferred embodiment, the carrier is silica which, prior to the use thereof in the first catalyst synthesis step, is dehydrated by fluidizing with dry nitrogen and heating at about 600° C. for about 16 hours to achieve a surface hydroxyl group concentration of about 0.7 mmols/gm. The silica of the most preferred embodiment is a high surface area, amorphous silica (surface area=300 $m^2$/gm; pore volume of 1.65 $cm^3$/gm), and it is a material marketed under the tradenames of Davison 952 or Davison 955 by the Davison Chemical Division of W. R. Grace and Company. It has the morphology of spherical particles, e.g., as obtained by a spray-drying process.

The carrier material is slurried in a non-polar solvent and the resulting slurry is contacted with at least one organomagnesium composition having the empirical formula (I). The slurry of the carrier material in the solvent is prepared by introducing the carrier material into the solvent, preferably while stirring, and heating the mixture to about 25° to about 100° C., preferably about 40° to about 60° C. The slurry is then contacted with the aforementioned organomagnesium composition, while the heating is continued at the aforementioned temperature.

The organomagnesium composition has the empirical formula $R_mMgR_n'$, where R and R' are the same or different C$_4$-C$_{12}$ alkyl groups, preferably C$_4$-C$_{10}$ alkyl groups, more preferably C$_4$-C$_8$ unsubstituted alkyl groups, and most preferably both R and R' are n-butyl groups, and m and n are each 0, 1 or 2, providing that m+n is equal to the valence of Mg.

Suitable non-polar solvents are materials in which all of the reactants used herein, i.e., the organomagnesium composition, the compound of formula (II) and the transition metal compounds are at least partially soluble and which are liquid at reaction temperatures. Preferred non-polar solvents are alkanes, such as hexane, n-heptane, octane, nonane, and decane, although a variety of other materials including cycloalkanes, such as cyclohexane, aromatics, such as benzene and ethylbenzene, can be employed. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals, and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the organomagnesium composition is added to the solution as will be deposited onto the support without leaving any excess of the organomagnesium composition in the solution. Furthermore, the molar amount of the organomagnesium composition deposited onto the support is greater than the molar content of the hydroxyl groups on the support. Thus, the molar ratios given below are intended to serve only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the compound of the formula (II), thereby forming a precipitate outside of the support which is detrimental in the synthesis and use of the catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 200° C. to about 850° C., the amount of the organomagnesium composition, such as dibutylmagnesium (DBM), added to the slurry is such that the molar ratio of Mg to the hydroxyl groups (OH) on the solid carrier is about 1:1 to about 3:1, preferably about 1.25:1 to about 3:1. In one particularly preferred embodiment silica is heated at about 600° C., and the amount of the organomagnesium composition is such that the molar ratio of Mg to OH on the silica is about 2.3:1 to about 2.6:1. The organomagnesium composition dissolves in the non-polar solvent to form a solution.

It is also possible to add such an amount of the organomagnesium composition which is in excess of that which will be deposited onto the support and then remove, e.g., by filtration and washing, any excess of the organomagnesium composition. However, this alternative is less desirable than the most preferred embodiment described above.

After the addition of the organomagnesium composition to the slurry is completed, the slurry is contacted with at least one chlorinated alcohol of the formula (II)

$$R''\text{—OH} \tag{II}$$

where R'' is a chlorinated C$_2$-C$_{10}$ alkyl group, preferably R'' is a chlorinated C$_2$-C$_4$ normal alkyl group and more preferably R'' is a chlorinated ethyl group. In one especially preferred embodiment, the compound of formula (II) is 2,2,2-trichloroethanol. The term "chlorinated alcohol" as used herein designates a C$_2$-C$_{10}$ alcohol having at least one of its hydrogens on the second (beta) or higher carbon atom replaced by chlorine. Thus, alcohols having chlorine on the first (alpha) carbon atom of the alcohol are not suitable for use in this invention. Carbon atoms of the alcohol are named in a conventional manner by naming the carbon most distant from the hydroxyl group (OH) as the alpha carbon, with the next carbon being beta carbon, etc. Examples of suitable chlorinated alcohols are 2-chloroethanol, 2,2-dichloroethanol, 2,2,2-trichloroethanol, 2-chloropropanol, 2,2-dichloro-propanol, 2,2,3-trichloropropanol, 2,2,3,3-tetrachloro-propanol, 2-chloro-n-butanol, 2,3-dichloro-n-butanol, 2,3,4-trichloro-n-butanol, 2,3,4,4-tetrachloro-n-butanol, and 2,2,3,3,4,4-hexachloro-n-butanol. We found that the use of the chlorinated alcohol in the synthesis of our catalyst composition substantially improves the activity and higher alpha-olefin (e.g., 1-butene, 1-pentene, 1-hexene or 1-octene) incorporation properties of the catalyst as compared to the use of analagous non-chlorinated alcohols or to the catalyst synthesized without any alcohols. The amount of the compound of the formula (II) used in this synthesis step is sufficient to convert substantially all of the magnesium alkyl (MgR or MgR') groups on the carrier to magnesium alkoxy (MgOR'') or magnesium chloride (Mg-Cl) groups. In a preferred embodiment, the amount of the formula (II) compound added is such that substantially no excess thereof is present in the non-polar solvent after substantially all of the magnesium alkyl groups are converted to the magnesium alkoxy or magnesium-chloride groups on the carrier to prevent the reaction of the formula (II) compound with the transition metal compound outside of the carrier. For example, for the silica heated at about 200° to about 850° C., the amount of the chlorinated alcohol of the formula (II) used herein is about 0.40 to about 3.0 mmols of chlorinated alcohol per gram of dried silica. This synthesis step is conducted at about 25° to about 65° C., preferably at about 30° to about 55° C., and most preferably at about 30° to about 40° C.

After the addition of the formula (II) compound is completed, the slurry is contacted with at least one transition metal compound soluble in the non-polar solvent. This synthesis step is conducted at about 25° to about 65° C., preferably at about 30° to about 55° C., and most preferably at about 30° to about 40° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, e.g., Ti, derived from the transition metal compound, e.g., $TiCl_3$ or $TiCl_4$, to the hydroxyl groups of the carrier is about 1 to about 3.0, preferably about 1.5 to about 2.5, and the molar ratio of Mg to the transition metal, e.g., Ti, is about 1 to about 4, preferably about 1.5 to about 3.5 and more preferably about 1.65 to about 3.00. We found that these molar ratios produce a catalyst composition which produces resins having relatively low melt flow ratio (MFR) values of about 20 to about 35. As is known to those skilled in the art, such resins can be utilized to produce high strength films and injection molding products which are resistant to warping or shrinkage.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds. After the addition of the transition metal compound is completed, the non-polar solvent is slowly removed, e.g., by distillation or evaporation.

The resulting free-flowing powder, referred to herein as a catalyst precursor, is combined with a conventional Ziegler-Natta catalyst activator, such as aluminum alkyls, e.g., aluminum trialkyls or aluminum alkyl hydrides. Other suitable activators are disclosed by John Boor, Jr., "Ziegler-Natta Catalysts and Polymerizations," Academic Press, New York (1979) pages 81-88, incorporated herein by reference. The most preferred activator is trimethylaluminum (TMA), although triethylaluminum (TEAL) which produces a somewhat less active catalyst, may also be used. We found that the combination of the precursor of this invention with the TMA, or, less preferably, TEAL, activator produces an alpha-olefin polymerization catalyst composition having very high activity, as compared to a catalyst composition comprising the same catalyst precursor and other catalyst activators.

The activated catalyst composition of this invention also exhibits extremely good higher alpha-olefin (i.e., $C_3$–$C_{10}$ alpha-olefin) incorporation properties when it is used to polymerize ethylene with such higher alpha-olefins. The activator is used in an amount which is at least effective to promote the polymerization activity of the solid catalyst component of this invention. If the activator is TMA or TEAL, the amount thereof is sufficient to give an Al:transition metal molar ratio in the activated catalyst composition of about 15:1 to about 1000:1, preferably about 20:1 to about 300:1, and most preferably about 25:1 to about 100:1.

Without wishing to be bound by any theory of operability, it is believed that the catalyst composition of this invention is produced by chemically impregnating the support with catalyst components sequentially added to the slurry of the carrier in the non-polar solvent. Therefore, all of the catalyst synthesis chemical ingredients must be soluble in the non-polar solvent used in the synthesis. The order of the addition of the reagents may also be important since the catalyst synthesis procedure is predicated on the chemical reaction between the chemical ingredients sequentially added to the non-polar solvent (a liquid) and the solid carrier material or a catalyst intermediate supported by such a material (a solid). Thus, the reaction is a solid-liquid reaction. For example, the catalyst synthesis procedure must be conducted in such a manner as to avoid the reaction of two or more reagents in the non-polar solvent to form a reaction product insoluble in the non-polar solvent outside of the solid catalyst support. Such an insoluble reaction product would be incapable of reacting with the carrier or the catalyst intermediate and therefore would not be deposited onto the solid support of the catalyst composition.

The catalyst precursor of the present invention is prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of catalyst precursor. Purification of the non-polar solvent employed in the catalyst synthesis is also helpful in this regard.

The catalyst may be activated in situ by adding the activator and catalyst precursor separately to the polymerization medium. It is also possible to combine the catalyst precursor and the activator before the introduction thereof into the polymerization medium, e.g., for up to about 2 hours prior to the introduction thereof into the polymerization medium at a temperature of from about −40° to about 100° C.

Polymerization

Alpha-olefins are polymerized with the catalyst prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The molecular weight distribution of the polymers prepared in the presence of the catalyst of the present invention, as expressed by the melt flow ratio (MFR) values, is about 20 to about 50, preferably about 20 to about 30, for LLDPE products having a density of about 0.89 gms/cc to about 0.940 gms/cc and an $I_2$ (melt index) of about 0.1 to about 50. Conversely, HDPE products, produced with the catalysts of this invention, have a density of about 0.94 gms/cc to about 0.97 gms/cc, MFR values of about 20 to about 40, preferably about 20 to about 30, and $I_2$ values of about 0.10 to about 50. As is known to those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low warpage and shrinkage on cooling of the injection molded products. The relatively low MFR values of the polymers prepared with the catalyst of this invention also indicate that they are suitable for the preparation of various film products since such films are likely to have excellent strength properties. MFR is defined herein as the ratio of the high load melt index (HLMI-$I_{21.6}$ or $I_{21}$) divided by the melt index ($I_{2.16}$ or $I_2$), i.e., $$MFR = \frac{I_{21.6}}{I_{2.16}}$$

where $I_{21.6}$ is determined according to the procedure of ASTM D-1238—condition E—measured at 190° C.—reported in grams per 10 minutes (gms/10 min) and $I_{2.16}$ is determined according to the procedure of ASTM D-1238, condition F—measured at 0.1 times the weight used in the $I_{21.6}$ determination.

The catalysts prepared according to the present invention are highly active and may have an activity of at least about 3.0–10.0 kilograms of polymer per gram of catalyst per 100 psi of ethylene.

The linear polyethylene polymers prepared in accordance with the present invention are homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. For LLDPE film applications, the most preferred comonomer is 1-hexene.

The linear low density polyethylene polymers produced in accordance with the present invention preferably contain at least about 60 percent by weight of ethylene units.

A particularly desirable method for producing linear low density polyethylene polymers according to the present invention is in a fluid bed reactor. Such a reactor and means for operating it are described by Levine et al, U.S. Pat. No. 4,011,382, Karol et al, U.S. Pat. No. 4,302,566 and by Nowlin et al, U.S. Pat. No. 4,481,301, the entire contents of all of which are incorporated herein by reference. The polymer produced in such a reactor contains the catalyst particles because the catalyst is not separated from the polymer.

The following examples further illustrate the essential features of the invention. However, it will be apparent to those skilled in the art that the specific reactants and reaction conditions used in the Examples do not limit the scope of the invention.

EXAMPLE 1

(Catalyst Precursor Synthesis)

The catalyst precursor of this invention was synthesized as follows. 17.1 grams of Davison 955 grade silica (previously calcined for about 16 hours under dry nitrogen at 600° C.) was slurried under nitrogen into 200 mls of dry hexane contained in a 500 ml round bottom flask fitted with an overhead stirrer and reflux condenser. Dibutylmagnesium was added dropwise (45 mls, 0.77M solution in heptane) and reflux continued for one hour. 2,2,2-trichloroethanol (5.9 mls) diluted in about 60 mls of hexane was added and reflux continued for 40 minutes. Finally, titanium tetrachloride (2.0 mls) diluted in about 30 mls hexane was added and reflux continued for one hour. Solvents were removed by distillation to give about 22 grams of a free-flowing powder.

EXAMPLE 2 (COMPARATIVE)

(Catalyst Precursor Synthesis)

A comparative catalyst precursor was synthesized in substantially the same manner as the catalyst precursor of Example 1, except that 2,2,2-trichloroethanol was omitted.

EXAMPLES 3-6

(Polymerization Process)

The catalyst precursors of Examples 1 and 2 were combined with triethylaluminum (TEAL) or with trimethylaluminum (TMA) catalyst activators to produce ethylene/1-hexene copolymers. A typical polymerization was carried out as follows in Example 3 with the catalyst of Example 1. At about 55° C., and under a slow nitrogen purge, a 1.6 liter stainless steel autoclave, previously heated to about 55° C. under a purge of dry nitrogen, was filled with 400 mls of dry hexane, 200 mls of dry 1-hexene and 3 mls of triethylaluminum (25 wt % in hexane). The reactor was closed, and hydrogen was introduced to raise the internal pressure to 20 psi. The contents of the reactor were stirred at 900 rpm and the temperature was increased to about 75° C.

The reactor was filled with ethylene to a total pressure of about 122 psi and then 0.052 grams of Example 1 catalyst precursor, slurried in about 50 mls of hexane, was added to the reactor. The reactor temperature was adjusted to 80° C. and the reactor pressure was maintained with ethylene.

The polymerization was continued for 37 minutes. 174 grams of polyethylene were obtained. The polymer contained 5.15 mole % 1-hexene and it had the following properties: $I_2 = 3.14$; $I_{21} = 109$; $I_{21}/I_2 = 34.7$; density = 0.9098 gm/cc. The results of Examples 3–6 are summarized in Table 1.

TABLE 1

| Example No. | Catalyst Precursor of Example | Cocatalyst | Productivity (g.PE/ g.Cat./hr.) | Density (gms/ cc) | Mole % 1-hexene | Reactivity ratio ($r_1$) |
|---|---|---|---|---|---|---|
| 3 | 1 | TEAL | 4370 | 0.910 | 5.15 | 92 |

TABLE 1-continued

| Example No. | Catalyst Precursor of Example | Cocatalyst | Productivity (g.PE/g.Cat./hr.) | Density (gms/cc) | Mole % 1-hexene | Reactivity ratio ($r_1$) |
|---|---|---|---|---|---|---|
| 4 | 2 | TEAL | 780 | 0.929 | 2.60 | 186 |
| 5 | 1 | TMA | 8100 | 0.912 | 4.85 | 77 |
| 6 | 2 | TMA | 1290 | 0.927 | 2.35 | 206 |

The reactivity of each catalyst used to copolymerize ethylene with 1-hexene is dependent on the catalyst composition. The 1-hexene response is expressed below as a reactivity ratio, $r_1$, defined by the equation:

$$1/f = 1/r_1 \cdot F$$

where
$f = (C_E/C_H) \text{copolymer}$
$F = (C_E/C_H) \text{monomer}$
$r_1 = kEE/kEH$ In the above formulae, subscripts E and H designate ethylene and 1-hexene, respectively; ($C_E/C_H$) copolymer is the mole percent of ethylene in the copolymer divided by the mole percent of 1-hexene in the copolymer; ($C_E/C_H$) monomer is the molar concentration of ethylene in the polymerization reactor divided by the molar concentration of 1-hexene in the polymerization reactor; the rate constants kEE and KEH are, respectively, the rates at which an ethylene or 1-hexene molecule reacts with an active site that previously reacted with ethylene. Thus, lower value of $r_1$ indicate improved 1-hexene incorporation properties.

The data of Table 1 indicates that the reactivity ratios of the catalyst of this invention (Example 1) are substantially lower than those of the comparative catalyst synthesized without 2,2,2-trichloroethanol (Example 2), indicating that the catalyst of this invention has substantially higher activity with 1-hexene than the comparative catalyst (Example 2). This is confirmed by the density data of Table 1 which indicates that at substantially the same polymerization conditions the catalyst of this invention produces polymers of substantially lower density than the comparative catalyst. For example, the reactivity ratio data of Example 3 indicates that with the TEAL-activated precursor of this invention ($r_1 = 92$) an ethylene molecule is inserted 92 times into the polymer molecule for every 1-hexene molecule that is inserted during the polymerization reaction. In the presence of the TMA activator, the reactivity ratio is even lower ($r_1 = 77$), indicating improved (about 16% better) 1-hexene incorporation properties with the TMA-activated catalyst precursor, i.e., an ethylene molecule is inserted 77 times for every 1-hexene molecule that is inserted into the polymer molecule. The data of Table 1 for the comparative catalyst indicates a much higher $r_1$ value, i.e., 186 for the TEAL-activated comparative catalyst (Example 4) than for the TEAL-activated catalyst of this invention, i.e., 92 (Example 3). Hence, the catalyst of this invention reacts about twice as well with 1-hexene (186/92 = about 2.0) as the comparative catalyst.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. In a process of copolymerizing ethylene with at least one $C_3$–$C_{10}$ alpha-olefin to produce a copolymer, comprising conducting the polymerization in the presence of a catalyst composition prepared by a process comprising the steps of:
   (i) contacting a slurry of a solid, porous carrier and a non-polar solvent with at least one organomagnesium composition having the formula $$R_m Mg R'_n \quad (I)$$

where R and R' are the same or different $C_4$–$C_{10}$ alkyl groups, m and n are each 0, 1 or 2, provided that m+n is equal to the valence of Mg;
   (iii) contacting the slurry of step (ii) with at least one transition metal compound soluble in the non-polar solvent; and combining the product of step (iii) with a catalyst activator,
   the improvement consisting essentially of
   (ii) contacting the slurry of step (i) with at least one compound of the formula $$R''{-}OH \quad (II)$$

where R'' is a $C_2$–$C_{12}$ chlorinated alkyl group; wherein R''—OH is free of chlorine atoms on the alpha carbon atom and has at least one of its hydrogens on a (beta) or higher carbon atom replaced by chlorine;
   (iv) combining the product of step (iii) with trimethylaluminum or triethyl aluminum, and
   (v) increasing alpha-olefin incorporation into the copolymer.

2. The process of claim 1, wherein the R''—OH is selected from the group consisting of 2-chloroethanol, 2,2-dichloroethanol, 2,2,2-trichloroethanol, 2-chloropropanol, 2,2-dichloro-propanol, 2,2,3-trichloropropanol, 2,2,3,3-tetrachloro-propanol, 2-chloro-n-butanol, 2,3-dichloro-n-butanol, 2,3,4-trichloro-n-butanol, 2,3,4,4-tetrachloro-n-butanol, and 2,2,3,3,4,4-hexachloro-n-butanol and admixtures thereof.

3. A process of claim 1 wherein R and R' are $C_4$–$C_8$ alkyl groups.

4. A process of claim 3 wherein R and R' are each butyl groups, m is 1 and n is 1.

5. A process of claim 4 wherein the non-polar solvent is a hydrocarbon which is liquid at ambient conditions.

6. A process of claim 5 wherein R'' is a $C_2$–$C_8$ chlorinated alkyl group.

7. A process of claim 6 wherein R'' is a chlorinated ethyl, propyl or butyl group.

8. A process of claim 7 wherein R'' is a 2,2,2-trichloroethyl group.

9. A process of claim 8 wherein the transition metal compound is a compound of titanium or vanadium.

10. A process of claim 9 wherein the transition metal compound is titanium halide.

11. A process of claim 10 wherein the titanium halide is titanium tetrahalide.

12. A process of claim 11 wherein the titanium tetrahalide is $TiCl_4$.

13. A process of claim 12 wherein the amount of the $TiCl_4$ present in said step (iii) is such that the molar ratio of Mg to Ti is about 1 to about 4.

14. A process of claim 13 wherein the amount of the TiCl$_4$ present in said step (iii) is such that the molar ratio of Mg to Ti is about 1.5 to about 3.5.

15. A process of claim 14 wherein the solid, porous carrier contains OH groups.

16. A process of claim 15 wherein the amount of the organomagnesium composition used in said step (i) is such that the molar ratio of Mg:OH is about 1:1 to about 3:1.

17. A process of claim 16 wherein the amount of the organomagnesium composition used in said step (i) is such that the molar ratio of Mg:OH is about 1.25:1 to about 3:1.

18. A process of claim 17 wherein the amount of the organomagnesium composition used in said step (i) is such that the molar ratio of Mg:OH is about 2.3:1 to about 2.6:1.

19. A process of claim 18 wherein the solid, porous carrier is silica which, prior to contact thereof with the solvent in step (i), is heated at a temperature of about 100° C. to about 1000° C.

20. A process of claim 19 wherein the silica is heated at a temperature of about 600° C.

21. A process of claim 20 wherein the silica has, after the heating, surface hydroxyl group concentration of about 0.7 mmoles/gr, a surface area of 300 m$^2$/gram and a pore volume of 1.65 m$^3$/gram.

22. A process of claim 1, wherein in said step (i) only such an amount of the organomagnesium composition is used which will be deposited onto the carrier; in said step (ii) only such an amount of the compound of the formula (II) is used which is sufficient to convert substantially all of the magnesium alkyl groups on the carrier to magnesium alkoxy or magnesium chloride groups, so that substantially no excess of the formula (II) compound is present in the non-polar solvent after substantially all of the magnesium groups are converted to the magnesium alkoxy or magnesium chloride groups; and in said step (iii) such an amount of the transition metal compound is used which is not greater than that which can be deposited on the carrier.

23. A process of claim 9 wherein the amount of the transition metal compound present in step (iii) is such that the molar ratio of Mg to the transition metal is about 1 to about 4.

24. A process of claim 23 wherein the amount of the transition metal compound present in said step (iii) is such that the molar ratio of Mg to the transition metal is about 1.5 to about 3.5.

25. A process of claim 24 wherein the amount of the transition metal compound present in said step (iii) is such that the molar ratio of Mg to the transition metal is about 1.65 to about 3.0.

26. A process of claim 1 wherein the C$_3$–C$_{10}$ alpha-olefin is propylene, 1-butene, 1-hexene, 1-octene, 4-methyl-1-pentene, a mixture of 1-butene and 1-hexene, a mixture of 1-butene and 1-hexene, a mixture of propylene and 1-hexene or a mixture of propylene and 1-butene.

27. A process of claim 26 wherein the C$_3$–C$_{10}$ alpha-olefin is 1-butene or 1-hexene.

28. A process of claim 27 wherein the aluminum trialkyl is trimethylaluminum.

* * * * *